Aug. 17, 1926.
M. MOSS
1,596,619
RIM SECURING MEANS
Filed May 21, 1925    2 Sheets-Sheet 1
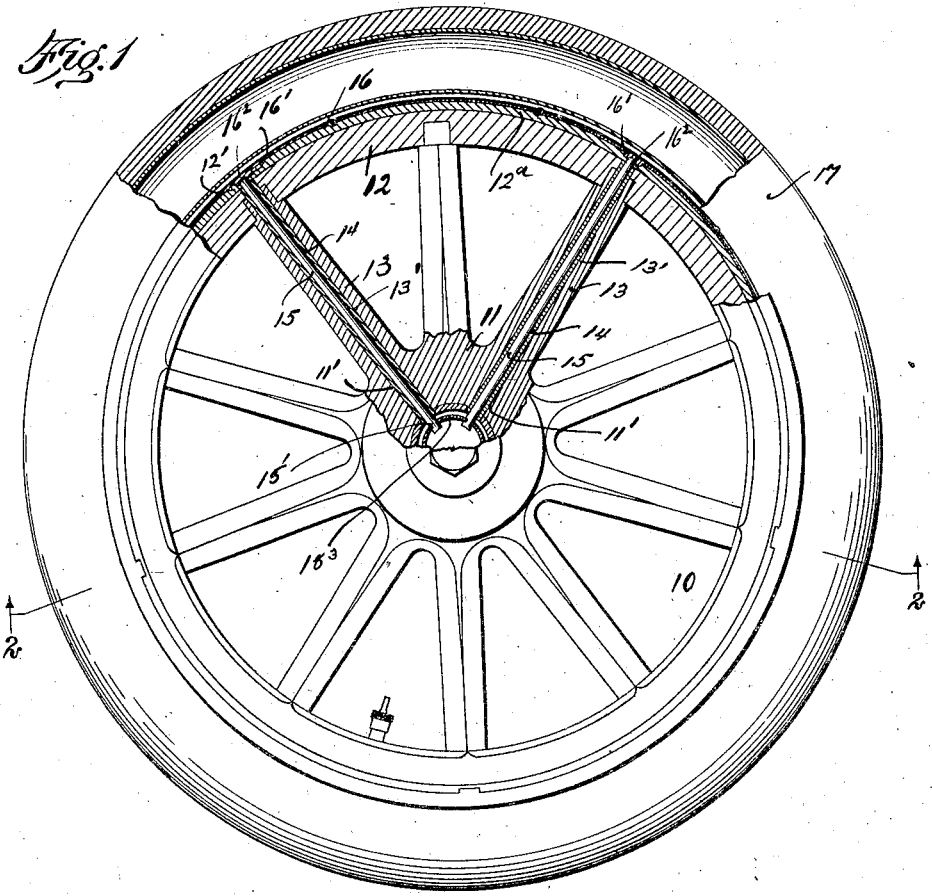
INVENTOR
Mauna Moss
BY
ATTORNEY Aug. 17, 1926.
M. MOSS
RIM SECURING MEANS
Filed May 21, 1925
1,596,619
2 Sheets-Sheet 2
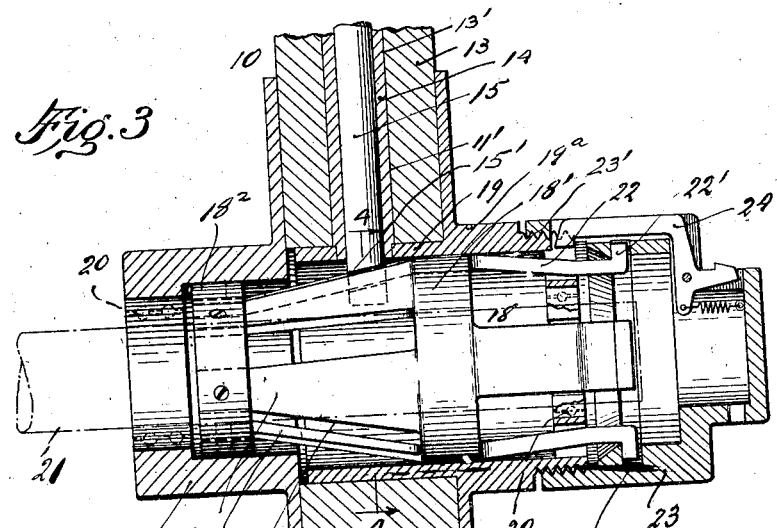
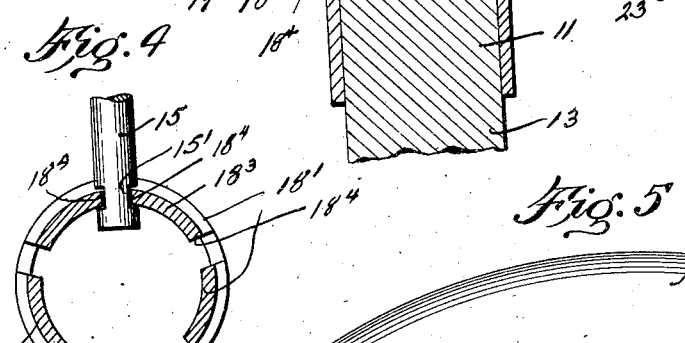
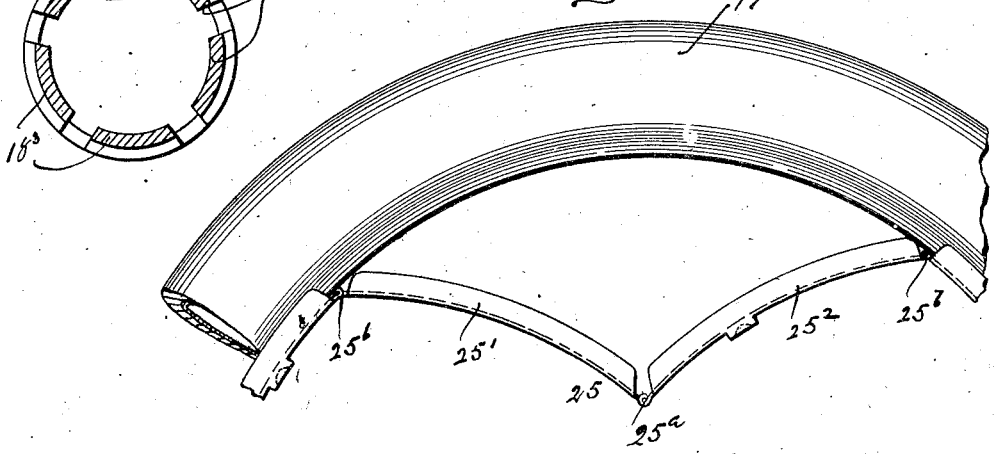
INVENTOR
Maurice Moss
BY
Mark H. Ordmann
ATTORNEY Patented Aug. 17, 1926.

1,596,619

UNITED STATES PATENT OFFICE.

MAURICE MOSS, OF NEW YORK, N. Y.

RIM-SECURING MEANS.

Application filed May 21, 1925. Serial No. 31,841.

This invention relates to tire wheels and particularly to means for fastening the removable tire rim to the wheel.

The hitherto used means for this purpose consist of a number of wedge-shaped members designed to be wedged between the removable rim and the wheel and have to be separately handled to tighten and untighten them, which work is very tedious and consumes much time. There is also the objection that frequently one or more of these wedges work themselves loose and become lost while driving.

The main object of my invention is to overcome these objections by providing means, which, by a single operation, will fasten or unfasten the rim.

Another object is to construct these means so as to more effectively and securely lock the tire rim in position than by the wedges referred to.

A further object of my invention is to provide an improved construction of a removable tire rim.

With these and other objects in view, my invention consists in the construction, combination and arrangement of parts as will be made clear in the following detailed description and as defined in the appended claims.

In the accompanying drawings forming part of this specification and in which similar reference characters denote corresponding parts, Fig. 1 is an elevation partly in section of a wheel equipped with my new device; Fig. 2 is a section on line 2—2 of Fig. 1; Fig. 3 is an enlarged cross-section of the hub portion of the wheel; Fig. 4 is a section on line 4—4 of Fig. 3 and Fig. 5 is an elevation of a portion of a tire and of the improved removable rim collapsed.

The wheel 10, which may be made of wood or cast iron or other suitable material and has, as usual, a nave 11 and felly 12, is formed with a plurality of hollow spokes 13 open at their ends, the cavities 13' in said spokes being in alignment with radial cavities 11' and 12' passing clear through the nave and the felly 12 respectively. These cavities 11', 12' are in diameter of the same size as the cavities 13' of the spokes. Suitably fixed in and extending through these cavities 11', 12', 13' are metal tubings 14 in which are slidably borne metal lock pins 15. The latter are made slightly longer than the total length of the three cavities 11', 12', 13'. The outer ends of these pins serve to engage the removable rim 16, which, as usual, carries the tire shoe 17 and is mounted around the felly 12 of the wheel, while the inner ends of said pins are adapted to project into the central hollow of the nave 11 to be in engagement with the means for operating the same.

These latter means comprise a substantially cone-shaped hollow body 18 composed of ring-shaped or cylindrical end members 18', $18^2$ and intermediate longitudinally extending conically curved members $18^3$ formed integrally with the inner end member 18' and fixed to the outer end member $18^2$. The longitudinal edges $18^4$ of these members are made to slope from the inner end ring or member 18' toward the outer end ring or member $18^2$ and adapted to engage the inner ends of the lock pins 15, so that while said conical body is displaced axially within the nave 11 in one or the other direction, its members $18^3$ will act as cams projecting or retracting the pins into or out of locking position, as will be presently described. The cylindrical end parts 18', $18^2$ of said conical body 18 are adapted to slidably bear in the sleeves 19, 19', which, as usual, are mounted in the nave and which serve to support the wheel by suitable bearings 20 on its axle 21 indicated in dotted lines in Fig. 3. There are as many members $18^3$ as there are hollow spokes or lock pins. In the present example, every other spoke is made hollow, and there are five lock pins and, therefore, five members $18^3$. The lock pins at their inner ends, which are adapted to project into the central hollow of the nave and into the space between adjacent members $18^3$, are each formed with an annular groove 15' made somewhat slanting in the longitudinal direction thereof to conform with the angle of inclination of the longitudinal edges of said members $18^3$. With these grooves, the said lock pins are adapted to each permanently but slidably engage, at opposite sides, the edges of two adjacent members $18^3$, so that, when the body 18 is displaced longitudinally and axially within the nave 11, the lock pins will be pulled inwardly or pushed outwardly, according to the direction of the movement imparted to the body 18. The removable tire rim 16 is, as usual, provided on its inner face with centering blocks or plates 16', that fit in grooves in the usual metal ring 12ª fixed around the felly 12. Now these blocks or plates 16', of which there may be as many as there are lock pins, are provided with circular cavities 16² into which the outer ends of the lock pins 15 will be projected, when the body 18 is moved into operative position to lock the rim 16.

For the manipulation of the body 18, I make use of the hub cup threaded on the outer bearing sleeve 19. To this end, from the outer end of member 18' project longitudinally and outwardly a number of arms 22, which may be integral parts of or attached to said inner member 18' and which, at their free ends 22', are bent to form hooks or the like. The cup 23, which is formed with internal threads 23' to work on the externally threaded extension 19ª of the outer bearing sleeve 19, is somewhat elongated and formed behind its threaded portion with an annular groove 23ª into which the hooked ends 22' of the arms 22 are snapped to permanently engage said groove. It will be seen that on unscrewing the cup 23, the conical body 18 will be moved outwardly, whereby its member 18³ will pull the lock pins 15 out of locking position and on turning the cup into tightening position, the cone will be moved inwardly pushing the lock pins into locking position. A safety member 24 of usual construction may be provided for locking the cup in its tightened position.

The removable rim may have a collapsible portion 25 composed of two sections 25', 25² hinged to one another, as at 25ª, and at their ends, as at 25ᵇ, to the body portion of the rim. By such construction, the rim can be readily removed from the flange of the wheel, after it has been released from the lock pins 15.

It is understood that various modifications may be made in the construction of my device without departing from the principle thereof. I, therefore, do not wish to restrict myself to the details described and shown.

What I claim is:—

1. A vehicle tire wheel having a plurality of hollow spokes, a removable rim for said tire, locking pins for said rim slidably borne in said hollow spokes, a cam body axially movable in the hub of said wheel and engaging said locking pins, members extending from said cam body outwardly through said hub and means turnable around the axis of the latter and engaging said last named members for moving said body, so as to project or retract said pins into and from locking position.

2. A vehicle tire wheel having a plurality of hollow spokes, a removable rim for said tire, locking pins for said rim slidably borne in said hollow spokes, a cam body axially movable in the hub of said wheel and engaging said locking pins, members extending from said cam body outwardly through said hub, and means turnable around the axis of the latter and having an annular groove engaging said members to move the latter and thereby project or retract said locking pins into and from their locking position.

3. In a vehicle tire wheel, the combination with a removable rim for the tire, of a plurality of hollow spokes, locking members for said rim slidably borne in said spokes, non-rotary means axially movable within the hub of said wheel and operating said locking members and means for operating the cam body turnable around the axis of said hub and movable longitudinally thereof.

4. In a vehicle tire wheel, the combination with a removable rim for the tire, of a plurality of hollow spokes, locking members for said rim slidably borne in said spokes, a non-rotary cam body axially movable within the hub of said wheel and operating said locking members while moved axially, means for operating said cam body turnable around the axis of said hub and movable longitudinally thereof.

5. In a vehicle tire wheel, the combination with a removable rim for the tire, of a plurality of hollow spokes, locking members for said rim slidably borne in said spokes, a cam body axially movable within the hub of said wheel and engaging said locking members, said cam body being formed with members extending outwardly through said hub, a bearing sleeve fixed to one end of said hub and a hub cup for operating said cam body threaded on said sleeve and having an annular recess engaging said last named members.

6. In a vehicle tire wheel, the combination with a removable rim for the tire, of a plurality of locking members for said rim, means axially movable within the hub of said wheel and capable of operating said locking members and means for operating said first named means turnable around the axis of said hub and movable longitudinally thereof.

In testimony whereof I affix my signature.

MAURICE MOSS.